(12) United States Patent
Mahar et al.

(10) Patent No.: US 11,770,674 B2
(45) Date of Patent: *Sep. 26, 2023

(54) SYSTEM AND METHOD FOR LIMITING MOBILE DEVICE FUNCTIONALITY IN A GEOGRAPHIC AREA

(71) Applicant: Cbros Technologies, LLC, Winter Park, FL (US)

(72) Inventors: Stephen Nelson Mahar, Eliot, ME (US); Donald Edward Williams, Jr., Winter Park, FL (US)

(73) Assignee: CBROS TECHNOLOGIES, LLC, Winter Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,307

(22) Filed: Feb. 23, 2021

(65) Prior Publication Data

US 2021/0185165 A1 Jun. 17, 2021

Related U.S. Application Data

(63) Continuation of application No. 16/160,175, filed on Oct. 15, 2018, now Pat. No. 10,931,816, which is a
(Continued)

(51) Int. Cl.
*H04M 1/72463* (2021.01)
*H04W 4/021* (2018.01)

(52) U.S. Cl.
CPC ....... *H04W 4/021* (2013.01); *H04M 1/72463* (2021.01); *H04M 1/724631* (2022.02)

(58) Field of Classification Search
CPC .......................... H04M 1/72463; H04W 4/021
See application file for complete search history.

(56) References Cited

U.S. PATENT DOCUMENTS

| 8,527,013 B2 | 9/2013 | Guba et al. |
| 2004/0111461 A1 | 6/2004 | Claudatos et al. |

(Continued)

OTHER PUBLICATIONS

Non-Final Office Action dated Mar. 23, 2017, U.S. Appl. No. 14/947,385.
(Continued)

*Primary Examiner* — Natasha W Cosme
(74) *Attorney, Agent, or Firm* — LOWNDES; Stephen C. Thomas

(57) ABSTRACT

A method, device and system for limiting mobile device functionality in a geographic area. When a mobile device is located within a predetermined geographic area, the mobile device receives a disabling signal from a disabling device. A Device Owner Application on the mobile device responds to the disabling signal, restricting functionality of the mobile device. Such restrictions may include restricting the mobile device's ability to send and receive text messages and email messages; restricting the mobile device's ability to respond to user input; restricting the mobile device's ability to place and receive phone calls; restricting the mobile device's ability to place and receive phone calls requiring user interaction with the mobile device; restricting the mobile device's ability to utilize a web browser application; restricting the mobile device's web browser from accessing predetermined web sites; and any other predetermined restriction of mobile device functionality as may be desired.

20 Claims, 11 Drawing Sheets

Related U.S. Application Data continuation-in-part of application No. 14/947,385, filed on Nov. 20, 2015, now Pat. No. 10,104,224, which is a continuation-in-part of application No. 14/212,740, filed on Mar. 14, 2014, now abandoned.

(60) Provisional application No. 61/801,025, filed on Mar. 15, 2013.

(56) References Cited

U.S. PATENT DOCUMENTS

| | | |
|---|---|---|
| 2010/0035588 A1 | 2/2010 | Adler et al. |
| 2010/0056181 A1* | 3/2010 | Rippon .................. H04W 8/22 |
| | | 455/456.3 |
| 2010/0124914 A1 | 5/2010 | Schmidt et al. |
| 2010/0210254 A1 | 8/2010 | Kelly et al. |
| 2011/0009107 A1 | 1/2011 | Guba et al. |
| 2011/0093161 A1 | 4/2011 | Zhou et al. |
| 2012/0015690 A1 | 1/2012 | Miao |
| 2012/0071151 A1 | 3/2012 | Abramson et al. |
| 2012/0268235 A1 | 10/2012 | Farhan |
| 2013/0072174 A1 | 3/2013 | Enty |
| 2013/0084847 A1 | 4/2013 | Tibbitts et al. |
| 2013/0157640 A1 | 6/2013 | Aycock |
| 2013/0184933 A1 | 7/2013 | Smith et al. |
| 2013/0190978 A1 | 7/2013 | Kato |
| 2013/0225086 A1 | 8/2013 | Hsu et al. |
| 2013/0244684 A1 | 9/2013 | Kadous |
| 2013/0273902 A1 | 9/2013 | Bolingbroke |
| 2013/0295908 A1 | 9/2013 | Zeinstra |
| 2013/0316737 A1 | 11/2013 | Guba et al. |
| 2014/0120890 A1 | 5/2014 | Barrett |
| 2014/0256303 A1 | 9/2014 | Jones |
| 2014/0274026 A1 | 9/2014 | Mahar et al. |

OTHER PUBLICATIONS

Final Office Action dated Dec. 15, 2017, U.S. Appl. No. 14/947,385.
Non-Final Office Action dated May 20, 2015, U.S. Appl. No. 14/212,740.
Written Opinion of the International Searching Authority, PCT/US2014/028881, dated Aug. 11, 2014.
Written Opinion of the International Searching Authority, PCT/US2016/062434, dated Mar. 9, 2017.
Non-Final Office Action dated Oct. 30, 2019, U.S. Appl. No. 16/160,175.
Final Office Action dated Aug. 7, 2020, U.S. Appl. No. 16/160,175.
Written Opinion and International Search Report, PCT/US2019/056164, dated Dec. 27, 2019.

* cited by examiner

SYSTEM AND METHOD FOR LIMITING MOBILE DEVICE FUNCTIONALITY IN A GEOGRAPHIC AREA

CROSS-REFERENCE TO RELATED APPLICATION

This application is a continuation of U.S. patent application Ser. No. 16/160,175, filed in the United States Patent and Trademark Office (USPTO) on Oct. 15, 2018 titled "SYSTEM AND METHOD FOR LIMITING MOBILE DEVICE FUNCTIONALITY IN A GEOGRAPHIC AREA", which was published by the USPTO as U.S. Patent Publication No. US 2020-0084314 A1 on Mar. 12, 2020 and which issued from the USPTO as U.S. Pat. No. 10,931,816 on Feb. 23, 2021, the disclosure of which is hereby incorporated by reference in its entirety; which is a continuation-in-part application (CIP) of U.S. patent application Ser. No. 14/947,385 filed in the United States Patent and Trademark Office (USPTO) on Nov. 20, 2015 titled "Limiting Mobile Device Functionality in a Vehicle" which was published by the USPTO as U.S. Patent Publication No. US 2017-0078474 A1 on Mar. 16, 2017, and which issued from the USPTO as U.S. Pat. No. 10,104,224 on Oct. 16, 2018, the disclosure of which is hereby incorporated by reference in its entirety; which was is a continuation-in-part application (CIP) of U.S. patent application Ser. No. 14/212,740, filed in the USPTO on Mar. 14, 2014, entitled "Limiting Mobile Device Functionality in a Vehicle", which was published by the USPTO as U.S. Patent Publication No. U.S. 2014-0274026 A1 on Sep. 18, 2014, the disclosure of which is hereby incorporated by reference in its entirety and which is a non-provisional of and claims priority to U.S. Provisional Patent Application No. 61/801,025, filed in the USPTO on Mar. 15, 2013, entitled "Method and System for Limiting Mobile Device Functionality in a Vehicle", which is also hereby incorporated by reference herein in its entirety.

FIELD OF INVENTION

The present disclosure generally relates to limiting the functionality of mobile devices when such devices are located within predetermined geographic areas. Such areas may be, for example, work areas designated by employers such as retail store sales floors, warehouses, factory and manufacturing facilities, and offices; areas related to vehicular traffic such as crosswalks and intersections; areas in which danger may be present requiring that a mobile device user stay alert and not be distracted by the use of a mobile device such as subway or train platforms; areas in which specified activities are expected to occur requiring a mobile device user to pay attention and not be distracted by the use of a mobile device such as classrooms or lecture halls; and any other geographic area in which it is desired that person's situational awareness not be diminished or subject to distraction. These examples of predetermined areas are exemplary only, and are not intended to be non-limiting.

BACKGROUND

The personal, societal, and economic impacts of the distracting nature of mobile device use are well chronicled. For example, studies show that texting while driving increases the risk of an accident by 2300%. Texting while driving resulted in 16,141 deaths in the U.S. between 2001 and 2007, and in 2009, 5,474 people were killed in the U.S. because of accidents that involved distracted driving. Another 448,000 were injured.

Younger generations have grown up using texting and email from a very young age. Most teenagers send hundreds, if not thousands, of texts each week, making it their primary form of communication. It is an engrained habit. Stepping away from it voluntarily, even when presented with the dangers to themselves and others they may impact, is very difficult. The increasing amount of accidents, cost, injuries, and deaths is alarming.

Current systems have attempted to address this issue but have major drawbacks. Such drawbacks include reliance on multiple voluntary actions by the driver and/or reliance on the motion of the vehicle (i.e. a certain minimum speed). There are many documented crashes involving a driver texting while driving at a slow speed, such as rolling slowly through a stop or red light into an intersection. Some systems rely on wireless transmissions, such as conventional Bluetooth®, that require synchronization with each vehicle. Some systems also gather driver performance data, such as speed or number of hard stops. Such systems may be considered intrusive on the driver's privacy. Many systems can be readily defeated by a driver determined to do so. In addition, some systems' components can be disabled without accountability to a monitoring entity.

As such, there is a need in the art for a system and method that can automatically limit mobile device functionality, including the ability to text, when a mobile device is within a geographic area that, preferably but not necessarily, has been predefined.

SUMMARY

In accordance with the teachings disclosed herein, embodiments related to a method, device, and system for limiting mobile device functionality in a predetermined geographic area are disclosed and claimed. Also disclosed is a system and method in which a vehicle has a disabling device associated therewith and the disabling device comprises a motion detector.

In an embodiment, the system comprises a disabling device and a mobile device. The disabling device has a motion detector, a microcontroller, and a signal generator. The microcontroller, which is in communication with the motion detector, receives a motion status of the vehicle from the motion detector. The signal generator, which is in communication with the microcontroller, transmits a disabling signal when it receives the motion status of the vehicle indicating that the vehicle is in motion. The mobile device, which has a software application residing thereon, receives the disabling signal. The software application alters the mobile device's system configuration responsive to the received disabling signal.

In an additional embodiment, the disabling device comprises a motion detector, microcontroller and a signal generator. The microcontroller, which is in communication with the motion detector, receives a motion status of the vehicle from the motion detector. The signal generator, which is in communication with the microcontroller, transmits a disabling signal when it receives the motion status of the vehicle indicating that the vehicle is in motion.

In another embodiment, a method comprises detecting, at the motion detector, a motion status of the vehicle. A disabling signal is transmitted to a mobile device in communication with the disabling device. The disabling signal is transmitted as long as the motion status of the vehicle indicates the vehicle is in motion. The determination of the motion status may repeat continuously or periodically. The disabling signal triggers a software application on the mobile device to limit the functionality of the mobile device.

In further embodiment, a method comprises polling, at a mobile device, for a disabling signal. The disabling signal originates at a disabling device. Once a disabling signal is received by the mobile device and it is determined that the disabling signal is valid, the mobile device's system configuration is altered by a software application on the mobile device. The mobile device continues polling for the disabling signal. The mobile device's system configuration is restored when the disabling signal is not received for a pre-determined amount of time.

In further embodiment, the invention comprises a system for limiting mobile device functionality in a geographic area in which it is desired to limit or control the use of a mobile device, comprising at least one disabling device having a signal generator in which the signal generator transmits a disabling signal that is effective in the geographic area, and a mobile device comprising a receiver for receiving the disabling signal, in which a Device Owner Application on the mobile device alters the mobile device's system configuration responsive to the disabling signal. The Device Owner Application residing on the mobile device may perform any combination of the following functions when the mobile device is located within the geographic area by altering the mobile device's system configuration: 1) restrict the mobile device's ability to send and receive text messages and email messages; 2) restrict the mobile device's ability to respond to user input; 3) restrict the mobile device's ability to place and receive phone calls; 4) restrict the mobile device's ability to place and receive phone calls requiring user interaction with a touch screen or a keyboard of the mobile device; 5) restrict the mobile device's ability to utilize a web browser application on the mobile device to access certain pre-determined web sites, to allow access to only certain pre-determined web sites, or the deny access to all web sites. In this embodiment, the signal generator and said mobile device receiver may form a communication link that does not require an affirmative action by a user to communicate. The geographic area is defined as any area in which it is desired to restrict use of a mobile device by a mobile device user, for example a work area, a school area, a vehicle traffic area, and a train platform. The invention also includes a method of limiting mobile device functionality in a geographic area in which it is desired to limit or control the use of a mobile device when the mobile device is located within a geographic area comprising providing a disabling device having a signal generator capable of transmitting a disabling signal, said disabling signal being effective within a desired geographic area, and not being effective outside the desired geographic area; transmitting said disabling signal within said desired geographic area; receiving said disabling signal by a mobile device comprising a Device Owner Application, said mobile device receiving said disabling signal as long as the mobile device is located within desired geographic area; and limiting the functionality of the mobile device by the Device Owner Application as long as the mobile device is located within desired geographic area. The method may also include polling, at the mobile device, for the disabling signal from the disabling device; receiving, at the mobile device, the disabling signal; and altering the mobile device's system configuration responsive to the disabling signal being valid, said altering carried out by said Device Owner Application. In an embodiment the method of the invention may further comprise receiving, at the mobile device, a second disabling signal; determining if the second disabling signal is valid; and restoring the mobile device's system configuration responsive to the second disabling signal being invalid, said restoring carried out by said Device Owner Application. The geographic area of the method may further be defined as being selected from the group consisting of a work area, a school area, a vehicle traffic area, and a train platform; and the functionality may be defined as being selected from the group consisting of the ability to place a phone call, the ability to send and receive text messages and email messages, the mobile device's ability to respond to user input, and the ability to utilize a web browser to access web sites via the Internet. The invention may comprise a method of limiting mobile device functionality in a geographic area in which it is desired to limit or control the use of a mobile device comprising: polling, at the mobile device, for a disabling signal from a disabling device; receiving, at said mobile device, a disabling signal from said disabling device; determining if the disabling signal is valid; altering, by a Device Owner Application on the mobile device, the mobile device's system configuration responsive to the disabling signal being valid; polling for the disabling signal; and restoring the mobile device's system configuration responsive to not receiving the disabling signal after a pre-determined amount of time. The disabling signal comprises an identifier. The Device Owner Application may alter the mobile device's system configuration by restricting the mobile device's ability to send and receive text messages and emails; restricting the mobile device's ability to respond to user input; restricting the mobile device's ability to place and receive phone calls; restricting the mobile device's ability to place and receive phone calls that require user interaction with a touch screen or a keyboard of the mobile device; restricting the mobile device's ability to utilize a web browser application on the mobile device to access pre-determined web sites, access only certain pre-determined web sites, or prohibit accessing any web sites whatsoever. The method may further comprise transmitting an alert to a monitoring party's device when the mobile device's ability to limit mobile device functionality in an operating vehicle is tampered with or disabled.

In the figures of the drawings, like item callouts refer to like features.

DETAIL DESCRIPTION OF THE EMBODIMENTS

A detailed description of the embodiments for a system, device, and method for limiting mobile device functionality in an operating vehicle will now be presented with reference to FIGS. 1 through 11. One of skill in the art will recognize that these embodiments are not intended to be limitations on the scope, and that modifications are possible without departing from the spirit thereof. In certain instances, well-known methods, procedures, components, and circuits have not been described in detail.

As used herein, "Device Owner Application" includes within its meaning a specific type of application that 1) must be loaded onto a mobile device at the time of manufacture of the mobile device, or is loaded onto a mobile device only after a hardware reset of the mobile device; and 2) cannot be disabled or turned off by a user of the mobile device unless a hardware reset of the device is performed. This is in contrast to an application that has been downloaded and installed on a mobile device from a web site such as an online application store ("downloaded applications"). Such downloaded applications may be deleted, disabled, or turned off by a user of the mobile device without the need for performing a hardware reset of the mobile device and are not within the definition of "Device Owner Application" A Device Owner Application is an application that cannot be defeated, disabled or uninstalled by a user of the mobile device. A Device Owner Application is structurally different from a downloaded application in that it runs as a Device Administrator on the mobile device, and as such may take control of mobile device configuration and security functions, and may alter the configuration of the mobile device. Downloaded applications are not able to take control of configuration and security functions, and are not able to alter the configuration of a mobile device.

As used herein, "application" or "software" includes within its meaning a set of non-transitory computer executable instructions that may be executed by a processor or controller, or by a plurality of processors or controllers. The non-transitory computer executable instructions may reside in a physical computer readable media that is in communication with the processors or controllers.

Figure 1:
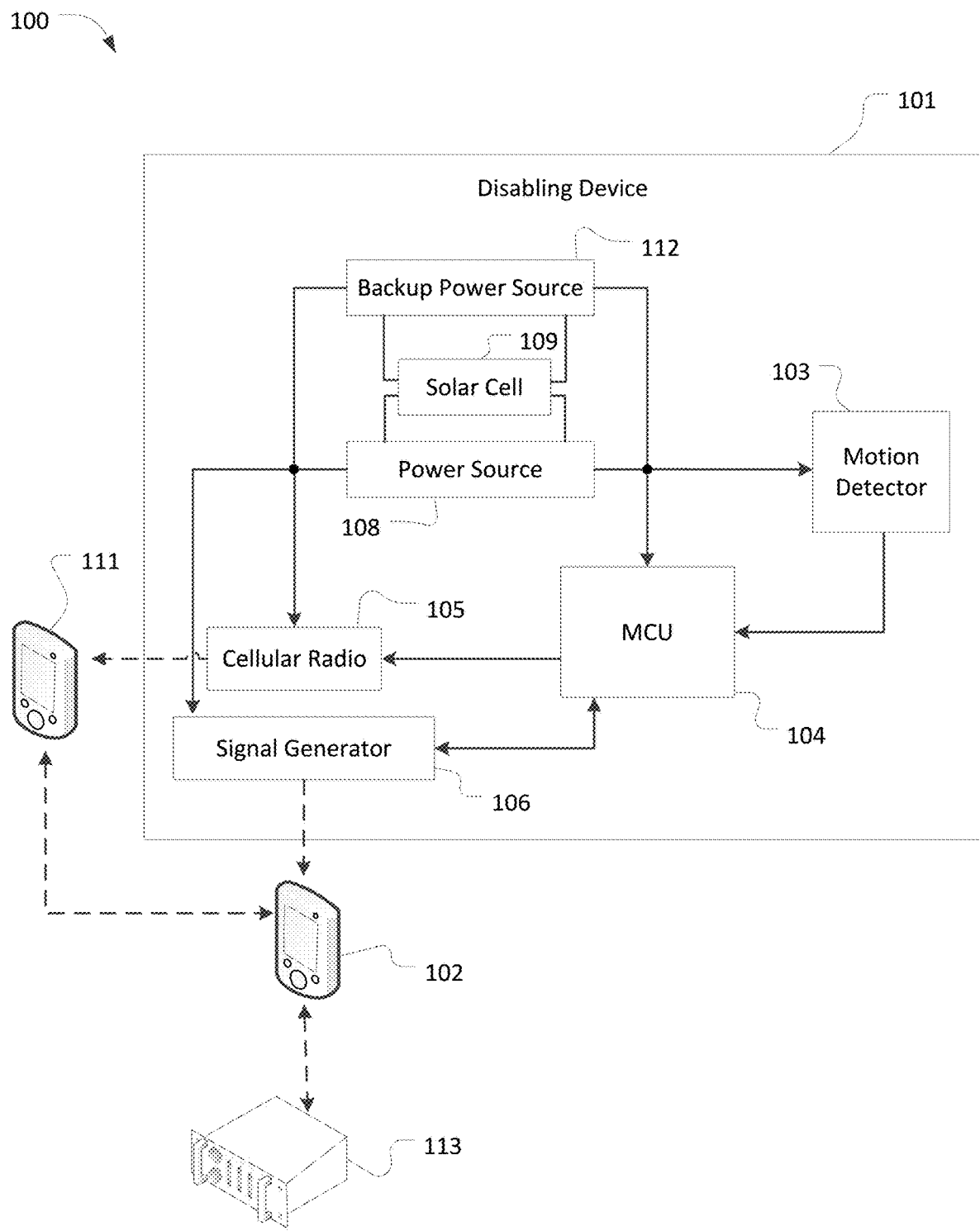
FIG. 1 is a block diagram of a system for limiting mobile device functionality in a vehicle according to an embodiment of the present invention.

In an embodiment, as shown in FIG. 1, system 100 comprises disabling device 101 and mobile device 102. Disabling device 101 can be mounted, installed or otherwise positioned in a vehicle, such as for example cars, trucks, buses, motorcycles, trains and other motor vehicles. Disabling device 101 may be encased in a compact enclosure, such as a polycase. Disabling device 101 may be compact for discrete mounting on a vehicle windshield. Disabling device may be positioned on the interior of the vehicle at or near the corner of the windshield, on the windshield near the rearview mirror or at another location within the vehicle. Disabling device 101 comprises motion detector 103, processor or microcontroller unit (MCU) 104 in communication with motion detector 103, cellular radio 105 in communication with MCU 104, signal generator 106 in communication with MCU 104, power source 108 in communication with motion detector 103, MCU 104, cellular radio 105, and signal generator 106. Disabling device 101 may optionally comprise backup power source 112 in communication with MCU 104. Backup power source 112 may also be in communication with one or more of motion detector 103, cellular radio 105, and signal generator 106. Disabling device may optionally comprise solar cell 109 in communication with power source 108. Solar cell 109 may also be in communication with backup power source 112. Mobile device 102, further shown and described below and in FIG. 6, has a software application, or app, (e.g. Device Owner Application (DOA), mobile device management system or other applicable software) residing thereon that is capable of receiving a disabling signal from disabling device 101.

Motion detector 103 determines the motion status of a vehicle. Motion detector 103 may be, for example, an accelerometer, a gyroscope or both an accelerometer and a gyroscope. Motion detector 103 may detect, for example, acceleration, direction (up/down/forward/backward), speed or a combination thereof. Motion detector 103 transmits a signal comprising the motion status to MCU 104. Upon arrival at MCU 104, the signal is converted into a signal readable by MCU 104. This can be accomplished, for example, through the use of peripheral interface technology such as UART/SPI (universal asynchronous receiver/transmitter/serial peripheral interface) or I2C (Inter-Integrated Circuit).

MCU 104 uses the motion status within the signal received from motion detector 103 to ascertain the motion status of the vehicle. If the motion status indicates that the vehicle is in motion, MCU 104 instructs signal generator 106 to broadcast a disabling signal. MCU 104 interfaces with signal generator 106, which may be, for example, a 802.11 radio, a Bluetooth® beacon, a Bluetooth® low energy beacon or any device that can transmit a similar electronic signal or trigger (which may optionally comprise an identifier), via any known mechanism, for example, UART or SPI. Motion detector 103 may detect movement of the vehicle causing it to produce a motion status indicating that the vehicle is in motion. Alternatively, motion detector 103 may only produce a motion status indicating that the vehicle is in motion once the motion has surpassed a certain threshold, such as, for example a pre-determined speed, a predetermined acceleration or a combination thereof. If the vehicle is not moving or alternatively, has not exceeded a movement threshold, motion detector 103 may produce a motion status indicating that the vehicle is not in motion. Alternatively, motion detector may not produce a signal, which may be interpreted by MCU 104 to mean that the vehicle was not in motion and that the motion status should so indicate. MCU 104 may continuously or periodically monitor motion detector 103 for vehicle movement.

If a disabling signal has been broadcast and mobile device 102 is in range of the broadcasting signal, the software residing on mobile device 102 will alter the system configuration of mobile device 102 to restrict the user's ability to perform certain tasks including, for example, using the keyboard, using the touch screen or sending and/or receiving text messages, email messages, and/or phone calls. Use of some features, such as maps, dialing 911 and voice-activated calling can still be permitted. Broadcast of the disabling signal will continue or be performed at regular intervals (e.g. every 20 seconds) until the motion status indicates that that the vehicle is not in motion. The disabling signal can be, for example, a Bluetooth® low energy beacon signal (or transmission). The broadcasting range of the disabling signal can be limited to only encompass the driver area or vehicle (e.g. 3-10 feet). The broadcast of the disabling signal may continue after the motion status of the vehicle becomes non-moving for a predetermined amount of time (e.g. one to two minutes).

MCU 104 ensures disabling device 101's operation by checking for connectivity to other disabling device components and for installation in and/or removal from a vehicle. This can be accomplished with internal programming and/or a physical or software switch. As an example of monitoring for installation and/or removal, if disabling device is attached to the vehicle (for example, on the windshield) using suction cups or adhesive or another similar mounting mechanism, a pressure switch can be used to detect installation and/or removal of the disabling device. In addition, MCU 104 monitors power source 108 for the status of the power supply.

System 100 can further include monitoring party's device 111. Cellular radio 105 communicates wirelessly with monitoring party's device 111. Monitoring party's device 111 may monitor the status of disabling device 101 and the app running on mobile device 102. Cellular radio 105 may use GSM cellular modules (global system for mobile communications) or any other known transmission service. Cellular radio 105 may include a subscriber identity module (SIM) card and may be equipped with SMS text capabilities. Cellular radio 105, at the direction of MCU 104, can send messages/alerts, such as, for example a short message service (SMS) push notification comprising an identifier of the disabling device to monitoring party's device 111, when certain events occur. For example, a message may be sent when disabling device 101 is activated, when disabling device 101 is removed from the vehicle, when the available power in power source 108 or back-up power source 112 is low or when cellular radio 105 has low cellular service as well as periodic alerts showing the device is working properly. The app running on mobile device 102 can also send notifications, such as 'app installed', 'app disabled', or 'app functioning normally', to monitoring party's device 111. The notifications from the app may include mobile device 102's phone number. A monitoring party may be an insurance company or a concerned parent. Monitoring party's device 111 enables the monitoring party to receive information verifying that disabling device 101 and the app running on mobile device 102 are operational.

Power source 108 may be, for example, a battery or a long life battery. Power source 108 may provide power to MCU 104, motion detector 103, cellular radio 105, and/or signal generator 106 if the element itself is not self-powered or it may serve as a secondary power source for any self-powered element. Disabling system may be hard-wired to the vehicle it is installed in. In this case, MCU 104, motion detector 103, cellular radio 105, and/or signal generator 106 may draw power from the vehicle's power source. Power source 108 may then be used in the event disabling device 101 is removed from the vehicle or the hard-wired connection is severed.

Backup power source, which may be for example a backup battery, may provide power to MCU 104 and cellular radio 105 to allow cellular radio 105 to send an alert to monitoring party 111 when MCU 104 detects that the power available in power source 108 is low. Backup power source 112 may also provide power to signal generator 106 and motion detector 103 when the power available from power source 108 is low to allow disabling device 101 to operate continuously.

MCU 104 may also store information related to the driver/user or to the vehicle disabling device 101 is attached to. Such information may include the account number and name of the user and the make, year, and/or model of the vehicle. Such information can also be transmitted, as needed, via cellular radio 103 to, for example, monitoring party's device 111, or via signal generator 106 to, for example, mobile device 102.

Solar cell 109 may be used to recharge power source 108 and/or backup power source 112.

System 100 may further include remote server 113 having a database (whitelist) containing a list of media access control (MAC) addresses or other unique identifier assigned to the signal generator of each disabling device in operation. Remote server 113 may be in bi-directional, wireless communication with mobile device 102. This list, or whitelist, can be queried by the software running on a mobile device to determine if a received disabling signal is coming from a valid source. This may prevent a bad actor from attempting to disable a phone by sending a disabling signal from an unauthorized device.

Figure 2:
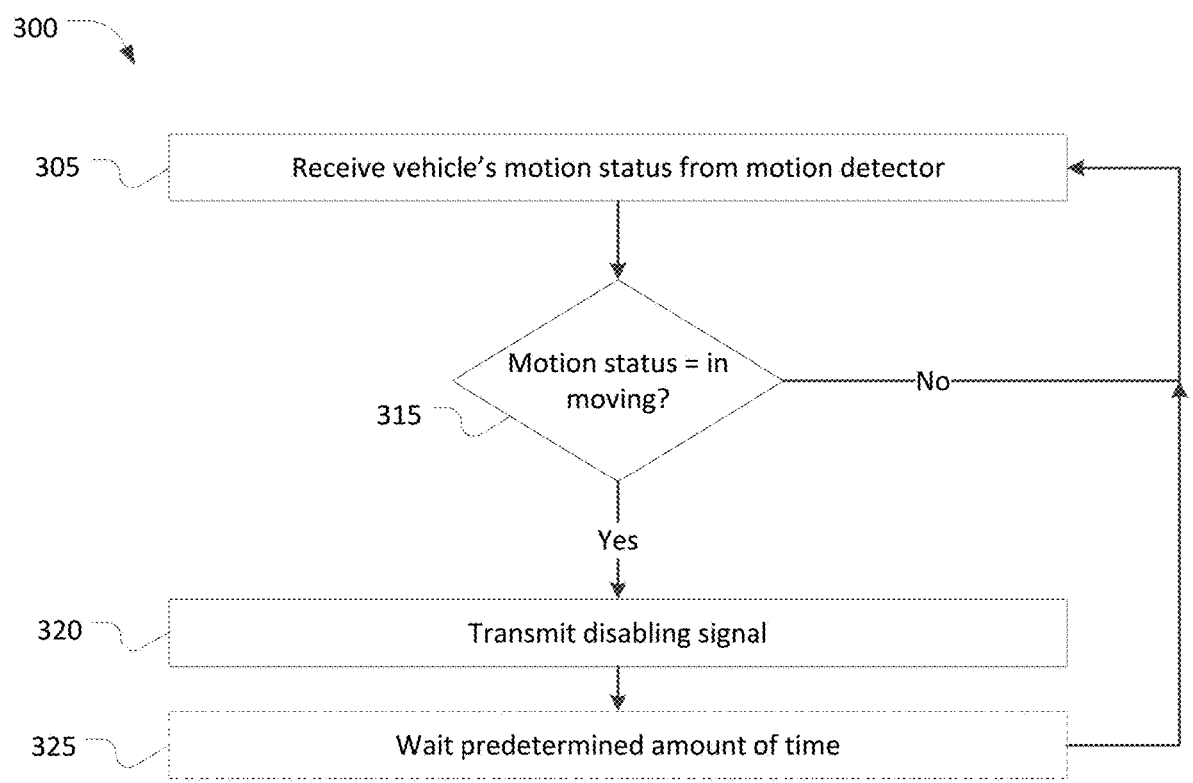
FIG. 2 is a flowchart of a method of limiting mobile device functionality in a vehicle from the perspective of the disabling device according to an embodiment of the present invention.

An embodiment of a method of the present invention from the perspective of disabling device 101 (method 300) is illustrated in the flowchart in FIG. 2 with reference to disabling device 101 of FIG. 1. As shown in operation 305, disabling device 101 receives the motion status of the vehicle from motion detector 103. If, in operation 315, the motion status indicates that the vehicle is not in motion, disabling device 101 continues receiving the motion status from motion detector 103. Otherwise, disabling device 101, in operation 320, transmits a disabling signal using signal generator 106. Disabling device 101 then repeats the process. Optionally, disabling device 101 can, in operation 325, wait a predetermined amount of time before repeating this process.

Figure 3:
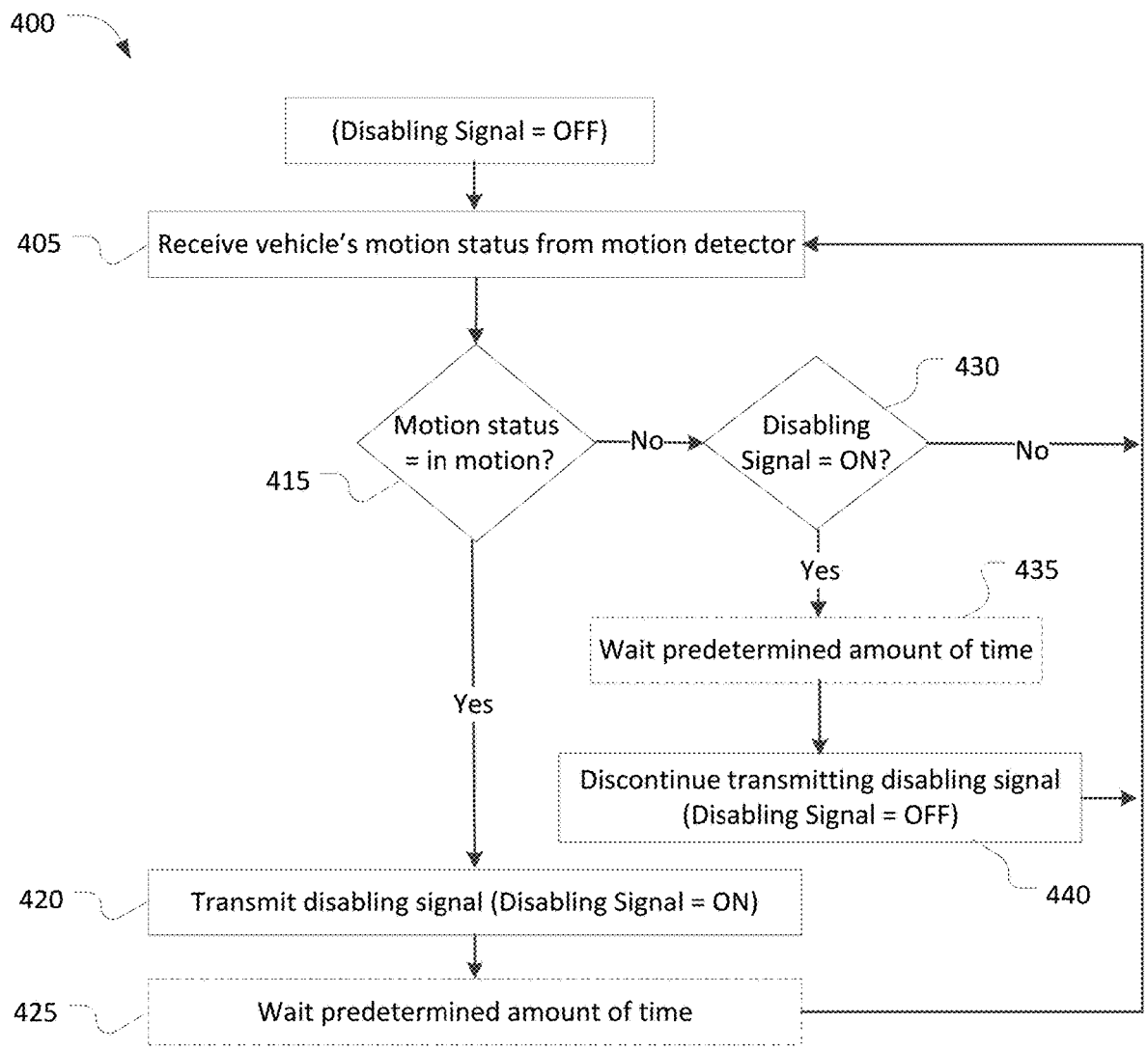
FIG. 3 is a flowchart of a method of limiting mobile device functionality in a vehicle from the perspective of the disabling device according to another embodiment of the present invention.

Another embodiment of a method of the present invention from the perspective of disabling device 101 (method 400) is illustrated in the flowchart of FIG. 3 with reference to disabling device 101 of FIG. 1. As shown, method 400 begins initially with the disabling signal turned off. In operation 405, disabling device 101 receives the motion status of the vehicle from motion detector 103. If, in operation 415, the motion status indicates that the vehicle is in motion, disabling device 101, in operation 420, transmits a disabling signal using wireless signal generator 106. Broadcast of the disabling signal continues while the vehicle is in motion. Disabling device 101 then repeats the process. Optionally, disabling device 101 can, in operation 425, wait a predetermined amount of time before repeating this process. If, in operation 415, the motion status indicates that the vehicle is not in motion, then disabling device 101, in operation 430, determines if the disabling signal is turned on. If the disabling signal is off, then the process repeats. If the disabling signal is on, then it is turned off in operation 440 and the process repeats. Optionally, disabling device 101 can, in operation 440, wait a predetermined amount of time before turning off disabling signal and repeating the process. Waiting a predetermined amount of time (e.g. one to two minutes) before repeating the process, allows for the host vehicle to come to a temporary stop (e.g. at a stop light or stop sign) without allowing the mobile device to return to normal operations.

Optionally, MCU 104 can monitor signal generator 106 for endpoint connectivity (e.g. a connection to mobile device 102) if such connectivity is possible with the technology used for the signal generator. Once a connection is established, disabling device 101 can send a wireless signal or notification to mobile device 102.

Figure 4:
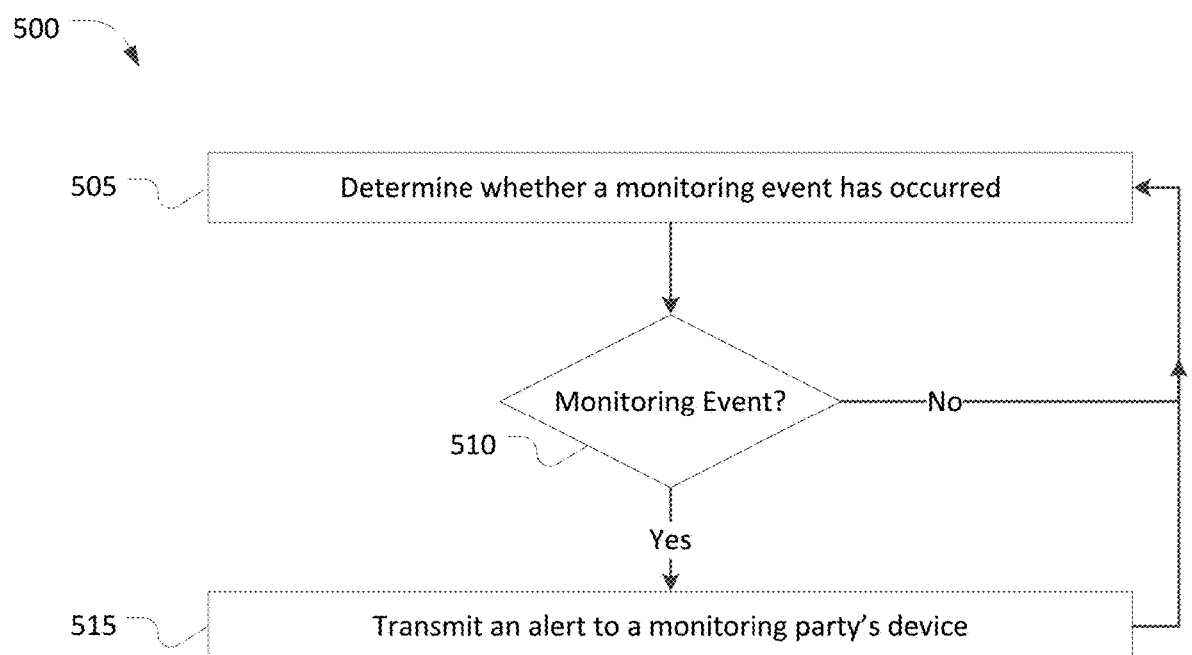
FIG. 4 is a flowchart of a method of issuing monitoring alerts from the perspective of the disabling device according to an embodiment of the present invention.

As discussed previously, cellular radio 105, at the direction of MCU 104, can send alerts, such as, for example a short message service (SMS) push notification, to monitoring party's device 111, when certain events occur. An embodiment of a portion of the method of the present invention that issues these alerts is shown in FIG. 4. In operation 505 of method 500, disabling device 101 determines whether a monitoring event has occurred. If, in operation 510, a monitoring event has occurred, an alert will be transmitted to monitoring party's device 111 in operation 515. If, in operation 510, no monitoring event has occurred, then disabling device 101 continues checking for a monitoring event.

Figure 5:
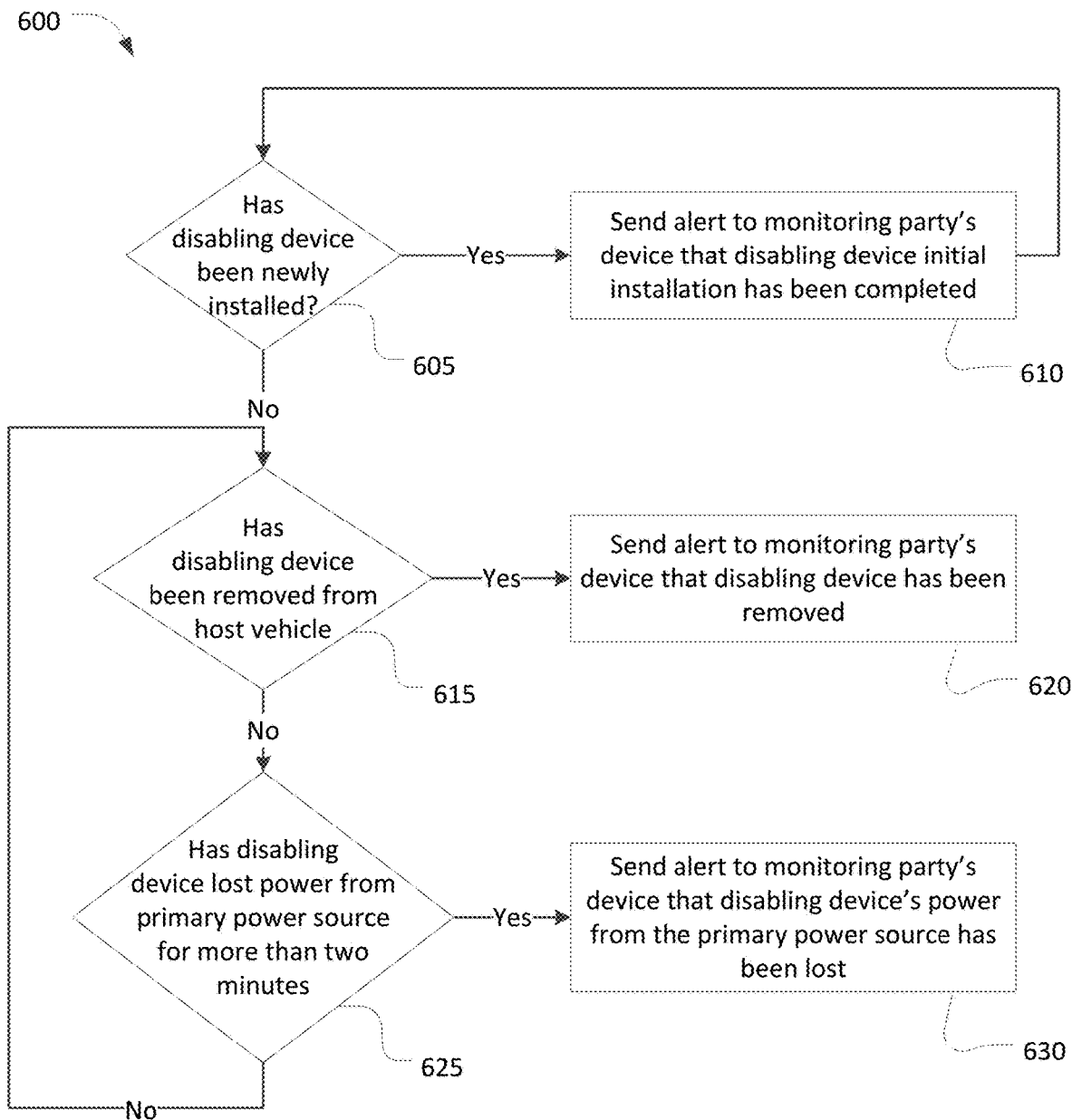
FIG. 5 is a flowchart of method of monitoring three exemplary events from the perspective of the disabling device according to an embodiment of the present invention.

Monitoring events may include disabling device 101 being removed from a host vehicle, disabling device 101 being secured in a host vehicle, or disabling device 101 losing power for a predetermined amount of time. A method of monitoring these three exemplary events (method 600) is illustrated in FIG. 5 with reference to disabling device 101 of FIG. 1. In operation 605, disabling device 101 determines if it has been newly installed in a host vehicle. If disabling device has been newly installed, then, in operation 610, cellular radio 105 sends an alert to monitoring party's device 111 indicating that the initial installation of disabling device 101 is complete. If the disabling device has not been newly installed, then, in operation 615, disabling device 101 determines if it has been removed from the vehicle. If disabling device 101 has been removed from the vehicle, then, in operation 620, cellular radio 105 sends an alert to monitoring party's device 111 indicating that disabling device 101 has been removed. If disabling device 101 is still installed, disabling device 101 determines if it has lost power from power source 108 for a predetermined amount of time (e.g. two minutes). This can be determined by monitoring MCU 104's interface with power source 108. If disabling device 101 has lost power from power source 108 for a predetermined amount of time, cellular radio 105, which may be powered by backup power source 112 or its own power source, sends an alert to monitoring party's device 111 indicating that disabling device 101 has lost power from power source 108. If disabling device 101 has not lost power from power source 108, then the process continues monitoring for disabling device 101's removal from the vehicle (operation 615) and disabling device 101 losing power from power source 108 (operation 625).

Disabling device 101 can also perform a self-test to ensure that its disabling signal is transmitting and power source 108 is operational. A monitoring alert can then be sent at pre-determined intervals (e.g. every 30 days) to monitoring party's device 111 indicating that disabling device 101 is functioning properly.

Figure 6:
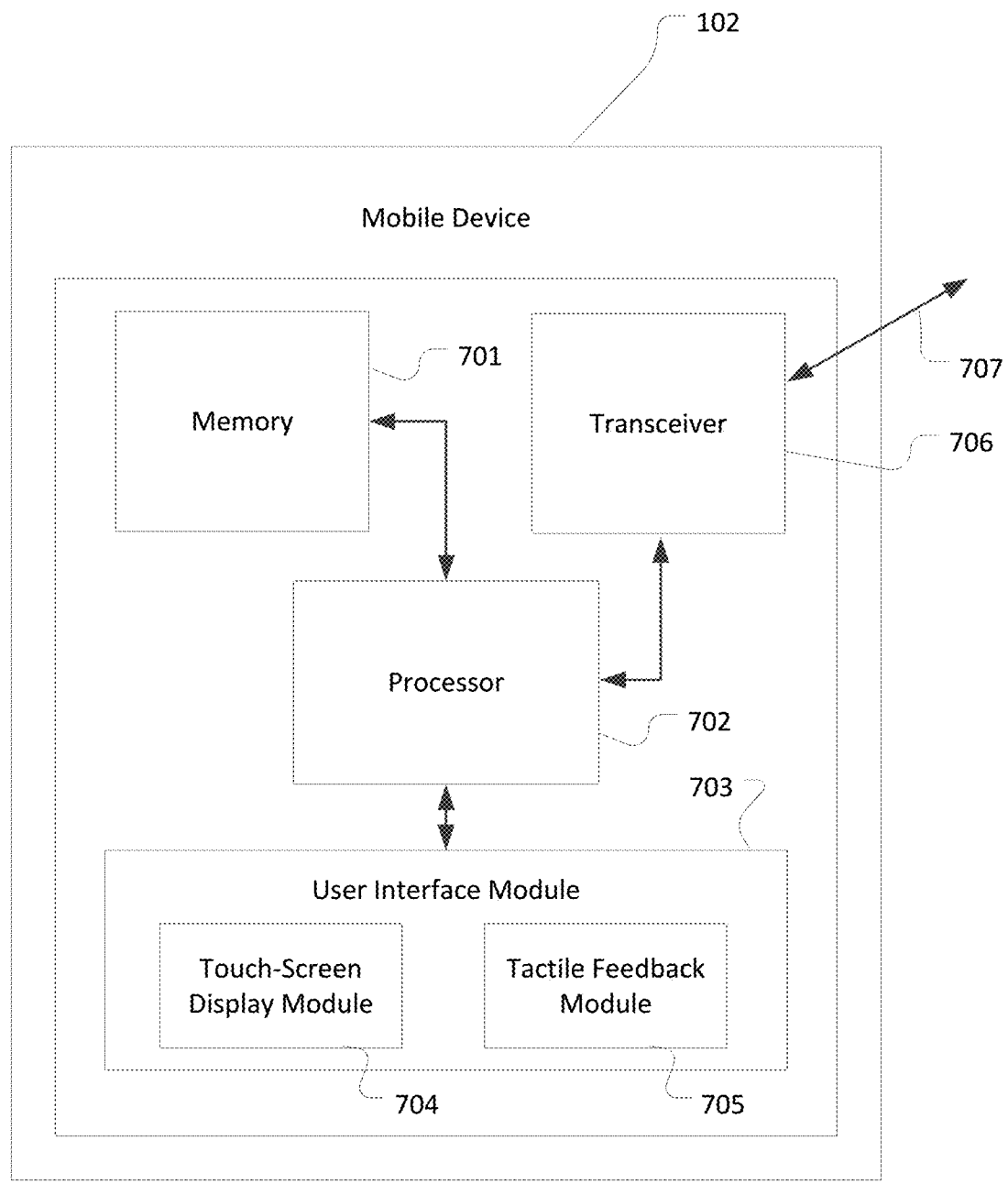
FIG. 6 is a block diagram illustrating an exemplary mobile device on which at least a portion of the method of limiting mobile device functionality in an operating vehicle may occur according to an embodiment of the present invention.
Figure 10:
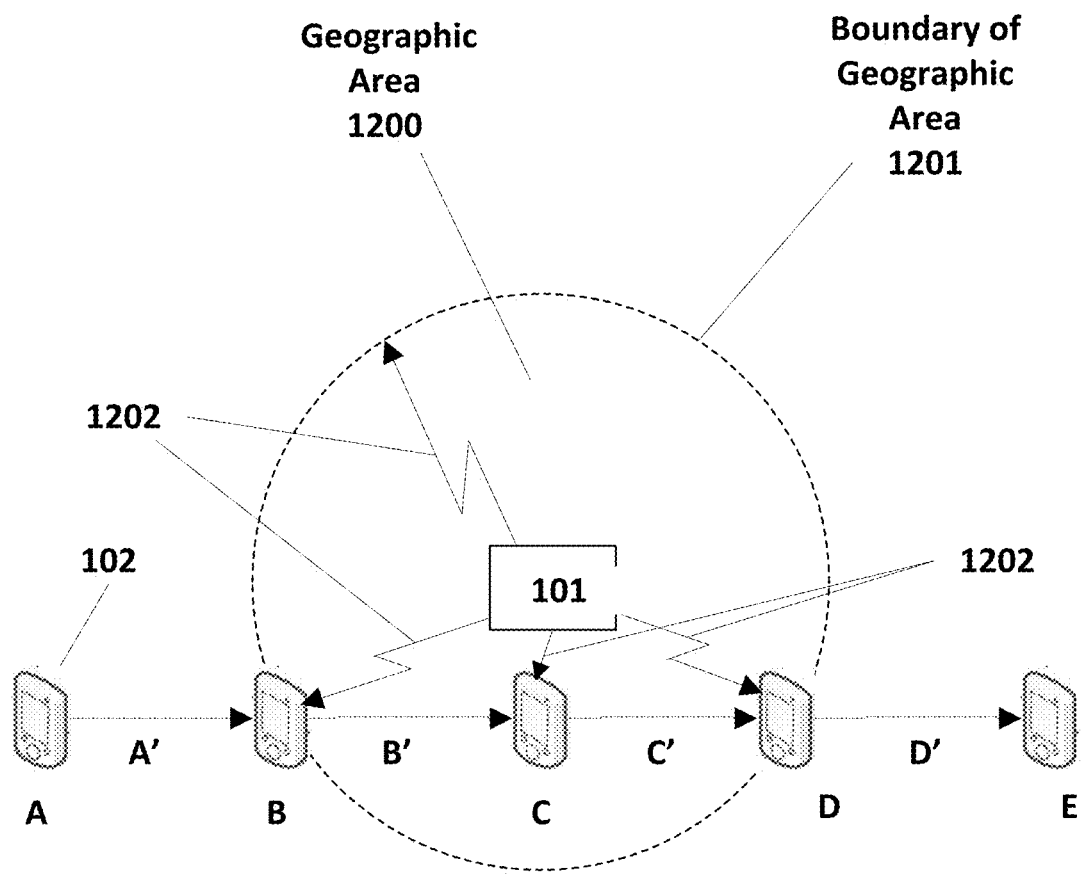
FIG. 10 depicts a system diagram for an embodiment of the invention in which the system and method of the device restrict mobile device functionality within a geographic area.

FIG. 6 is a block diagram of a mobile device 102 according to an exemplary embodiment, which may be, for example mobile device 102 as described above and shown in FIGS. 1 and 10. The exemplary mobile device includes memory 701 in communication with processor 702 and user interface module 703, which includes touch-screen display module 704 and tactile feedback module 705, all of which is described in further detail below. Mobile device 102 may also comprise transceiver 706 for receiving or transmitting, or both, wireless signals 707, which may be any radio frequency (RF) signals such as WiFi, Bluetooth®, Low Energy Bluetooth®; Near Field Communications (NFC) or any other RF signal of any type or nature; optical signals such as infrared optical signals; or any other wireless signals known in the art. Processor 702 may be in communication with transceiver 707. In an embodiment, wireless signal 707 may be the wireless signal 1202 as depicted in FIG. 10. It should be understood, that a mobile device as illustrated and hereinafter described is merely illustrative of a mobile device that could benefit from embodiments of the invention and, therefore, should not be taken to limit the scope of the invention. While one embodiment of the mobile device is illustrated for purposes of example, other types of mobile electronic devices, such as, but not limited to, mobile phones, smart phones, portable digital assistants (PDAs), tablets, mobile computing devices, gaming devices, laptop computers, media players, and other types of mobile electronic systems, may readily employ embodiments of the invention.

Figure 7:
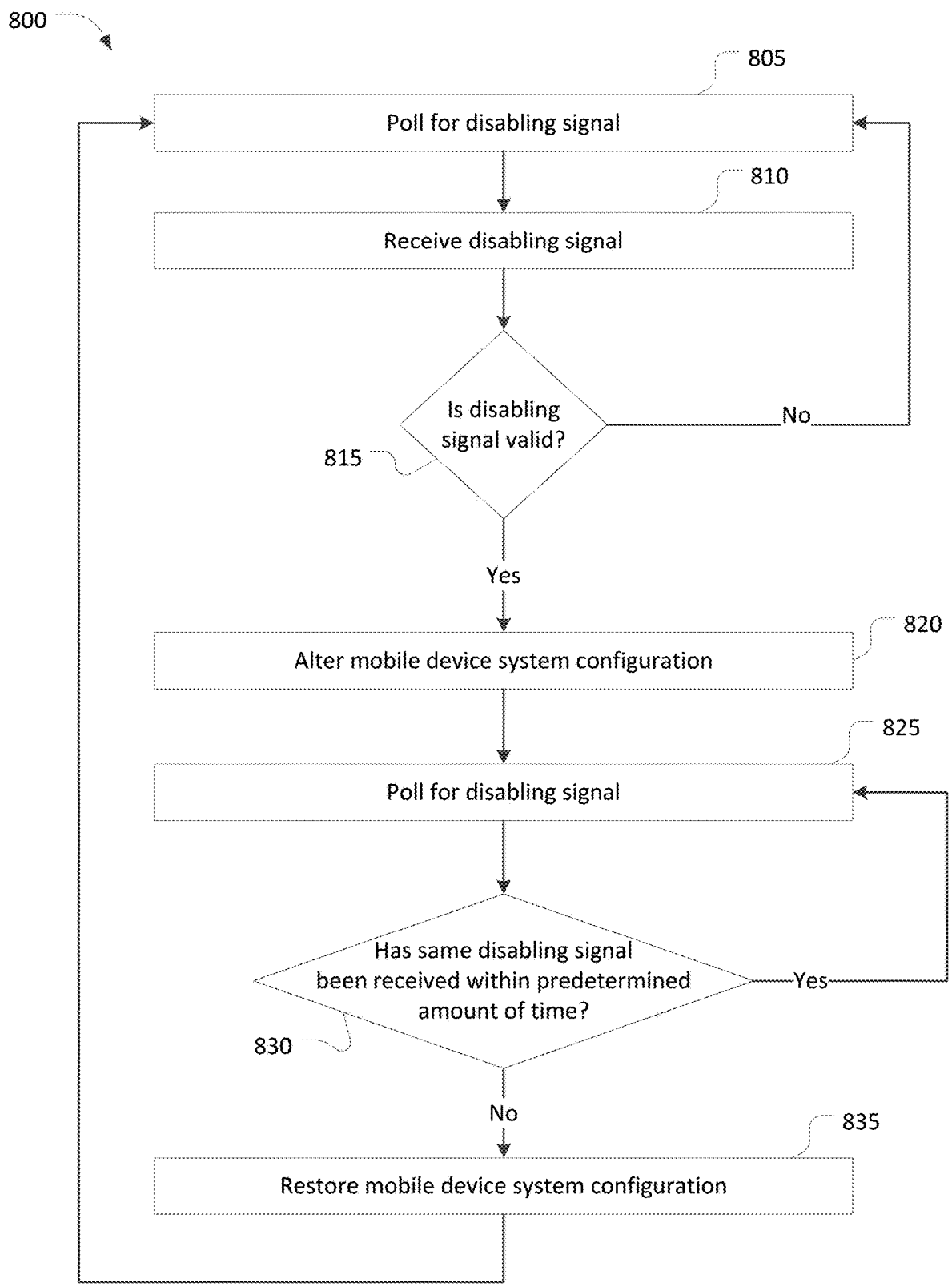
FIG. 7 is a flowchart of a method of limiting device functionality in an operating vehicle from the perspective of the mobile device according to an embodiment of the present invention.

An embodiment of the method of the present invention from the perspective of mobile device 102 (method 800) is illustrated in the flowchart of FIG. 7. As shown in operation 805, software running on mobile device 102 polls for a disabling signal. Once a disabling signal is received (in operation 810), the software determines if it is valid in operation 815. If the disabling signal is not valid, the software continues polling for a disabling signal in operation 805. If the disabling signal is valid, then the software alters the system configuration of mobile device 102 in operation 820 to restrict the user's ability to perform certain tasks. These tasks may include, for example, using the keyboard, or sending and/or receiving text messages and/or email messages, placing and/or receiving phone calls, or placing and/or receiving phone calls when not in hands-free mode. In operation 825, the software continues to poll for a disabling signal. In operation 830, the software determines if the same disabling signal has been received within a predetermined period of time. If it has, then the software continues to poll for a disabling signal (operation 825). If the same disabling signal has not been received within a predetermined period of time, the software restores the system configuration of mobile device 102 in operation 835.

Figure 8:
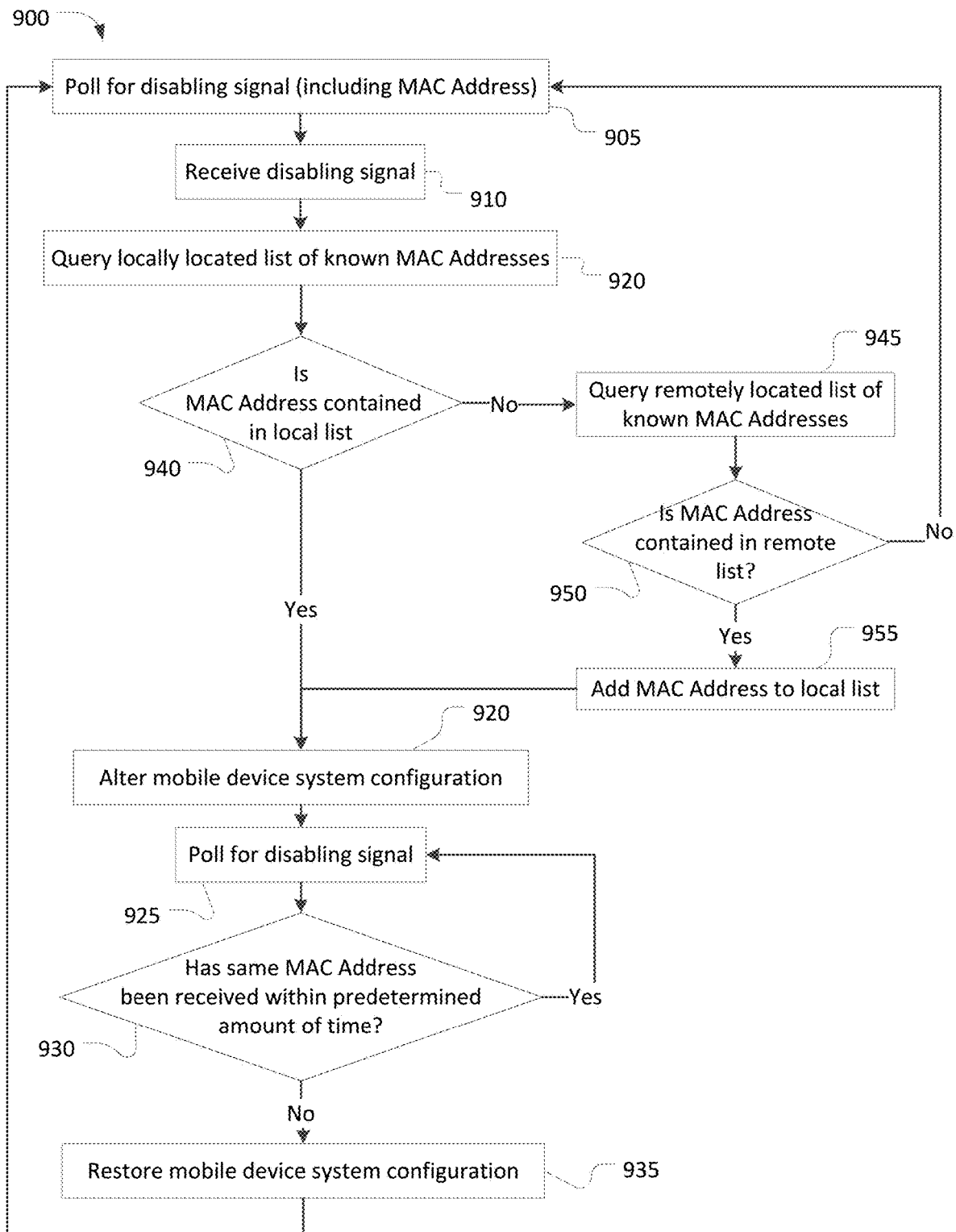
FIG. 8 is a flowchart of a method of limiting mobile device functionality in a vehicle from the perspective of the mobile device according to an embodiment of the present invention.

Another embodiment of the method of the present invention from the perspective of mobile device 102 (method 900) is illustrated in the flowchart of FIG. 8. As shown in operation 905, software running on mobile device 102 polls for a disabling signal. The disabling signal, which may be, for example a Bluetooth® beacon signal (or transmission), includes identifiers, such as, for example, a universally unique identifiers (UUID) or a MAC address. Once a disabling signal is received (in operation 910), the software queries, in operation 920, a locally located list of known identifiers to determine, in operation 940, if the identifier received in the disabling signal is contained in the local list. If the identifier is not in the local list, then, in operation 945, a remotely located list of known identifiers is queried to determine, in operation 950, if the identifier is contained in the remote list. If the identifier is not contained in the remote list, the identifier is not recognized and the software continues polling for a disabling signal in operation 905. If the MAC address is contained in the remote list, the MAC address is added to the local list in operation 955. Once a valid MAC address has been confirmed, the software alters the system configuration of mobile device 102 in operation 920 to restrict the user's ability to perform certain tasks including, for example, using the keyboard, or sending and/or receiving text messages, email messages, and/or phone calls. In operation 925, the software continues to poll for a disabling signal. In operation 930, the software determines if the same network identifier has been received within a predetermined period of time. If it has, then the software continues to poll for a disabling signal (operation 925). If the same disabling signal has not been received within a predetermined period of time, the software restores the system configuration of mobile device 102 in operation 935.

Like disabling device 101, the software running on mobile device 102 can protect itself from tampering and verify its own operable status by transmitting alerts, such as, for example, a SMS push notification containing, for example, mobile device 102's phone number, to monitoring party's device 111. Monitoring events can include the software being installed on mobile device 102 or the software being disabled. The software running on mobile device 102 may comprise two separate apps—a primary system app and a secondary app. The primary app may be monitored by the secondary app. The purpose of the secondary app is to send an alert to monitoring party device 111 in the event of removal of the primary app. The primary app also monitors the secondary app and sends an alert to monitoring party device 111 in the event of removal of the secondary app. In this respect the primary and secondary app independently monitor each other for removal, making the app portion of the system self-protecting. Methods (methods 1000, 1015, and 1030) that issue exemplary alerts originating from mobile device 102 are shown in FIGS. 9A through 9C.

Figure 9A:
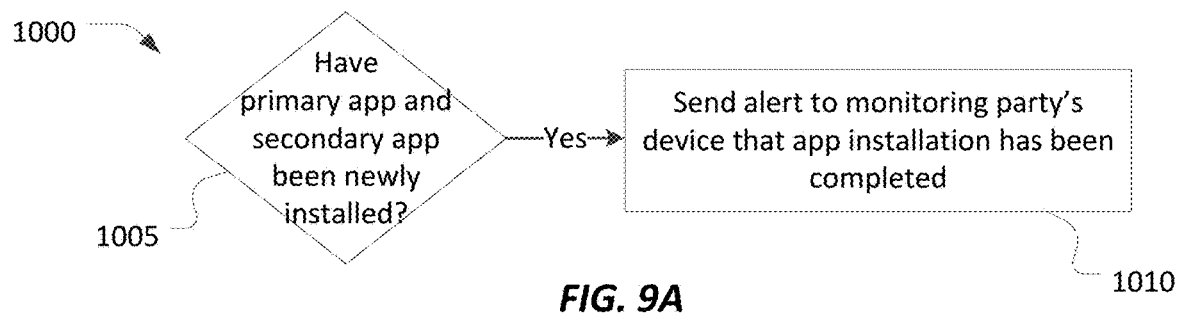
FIGS. 9A through 9C are flowcharts of methods of issuing monitoring alerts from the perspective of the mobile device according to another embodiment of the present invention.

As shown in FIG. 9A, method 1000 determines, in operation 1005, if the primary app and the secondary app have been newly installed on mobile device 102. If the software has been newly installed, then, in operation 1010, mobile device 102 sends an alert to monitoring party's device 111 indicating that the software installation has been completed.

Figure 9B:
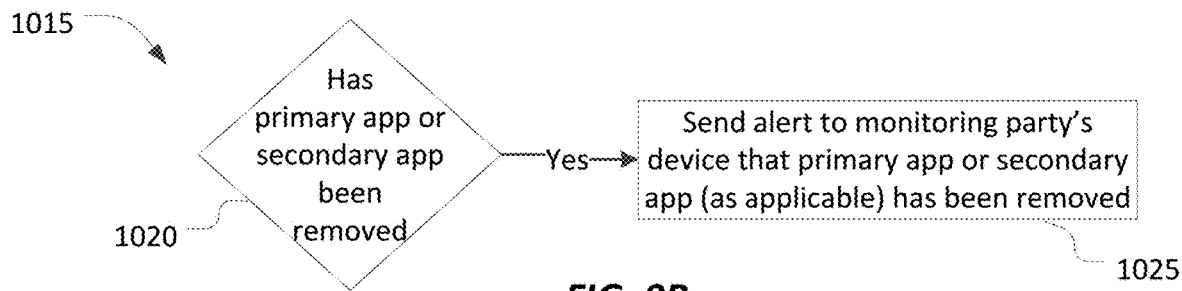

As shown in FIG. 9B, method 1015 determines, in operation 1020, if the primary app or the secondary app has been removed. If either app has been removed, then, in operation 1025, an alert is sent to monitoring party's device 111 indicating that the primary app or secondary app (as applicable) has been removed.

Figure 9C:
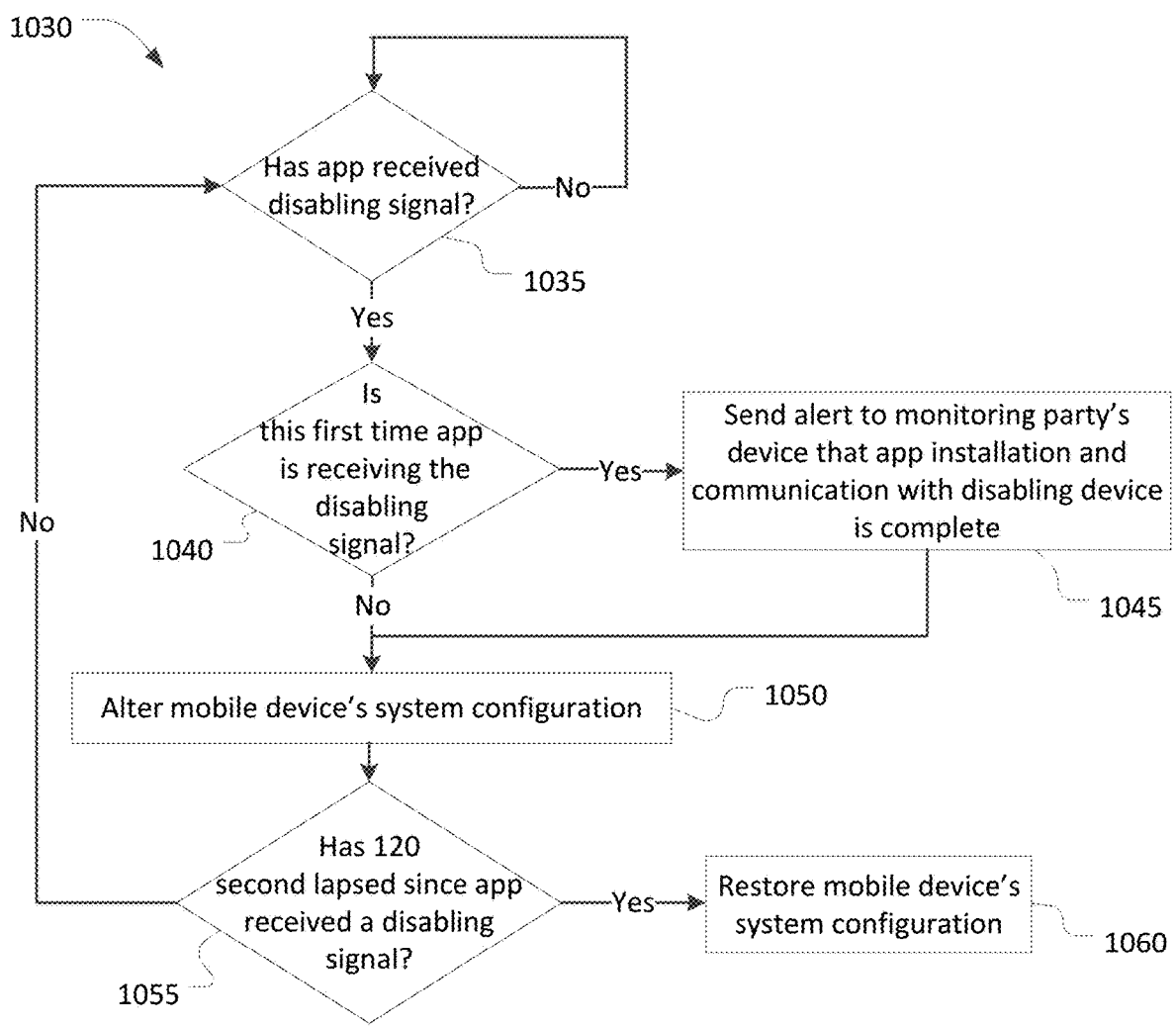

As shown in FIG. 9C, method 1030 determines, in operation 1035, if mobile device 102 has received a disabling signal. If no disabling signal has been received, then the software continues to wait for the disabling signal to arrive. If a disabling signal has been received, then, in operation 1040, the software determines if it is the first time mobile device 102 is receiving the disabling signal. If this is not the first time mobile device 102 has received a disabling signal, then the system configuration of mobile device 102 is altered in operation 1050. If this is the first time mobile device 102 has received a disabling signal, then, in operation 1045, an alert is sent to monitoring party's device 111 indicating that the software installation and communication with disabling device 102 has completed. The system configuration of mobile device 102 is then altered in operation 1050. After mobile device 102's system configuration has been altered, the software, in operation 1055, determines if a predetermined amount of time (e.g. two minutes) has lapsed since mobile device 102 received a disabling signal. If not, then the software continues polling for a disabling signal in operation 1035. If the predetermined amount of time has lapsed then the software restores the system configuration of mobile device 102 in operation 1060.

The software running on mobile device 102 can also perform a self-test to ensure that it is receiving disabling signals at expected intervals (e.g. every 15 seconds or twice within any 30 second window) and it is altering mobile device 102's system configuration upon receipt of a valid disabling signal. A monitoring alert can then be sent at pre-determined intervals (e.g. every 30 days) to monitoring party's device 111 indicating that the software running on mobile device 102 is functioning properly.

The following are exemplary scenarios demonstrating pre-operational functionality of embodiments of the present invention.

Disabling device set-up—the disabling device is intact but not in the vehicle:
Motion detector: Inactive.
Power source (battery): Inactive (charged).
MCU: Inactive.
Signal generator: Inactive.
Cellular Radio: Inactive.
Disabling device installed—the vehicle is not moving:
Motion detector: Power available from disabling device's battery
Power source (battery): Inactive (charging).
MCU: Recognizes connectivity to the motion detector via internal programming, physical switch or software switch and initiates a monitoring alert (e.g. push notification); analyzes the signal from the motion detector for the motion status of the vehicle.
Signal generator: Inactive.
Cellular Radio: Transmits 'Disabling device installed' alert to the monitoring party's device.
Vehicle not moving; disabling device installed:
Motion detector: Active
Power source (battery): Active
MCU: Active; monitoring the motion detector
Signal generator: Inactive
Cellular Radio: Inactive
Disabling device is removed:
Motion detector: Inactive
Power source (battery): Active (discharging); Powers the MCU and the cellular radio
MCU: Recognizes the lack of connectivity of the disabling device to the vehicle via internal programming, physical switch or software switch; engages the battery and initiates a monitoring alert indicating that the disabling device has been disconnected
Signal generator: Inactive
Cellular Radio: Transmits monitoring alert (e.g. push notification) indicating that the disabling device has been disconnected to the monitoring party's device The following are exemplary scenarios demonstrating operational functionality of embodiments of the present invention.

Vehicle not moving; disabling device installed:
Motion detector: Power available from disabling device battery
Power source (battery): Active (charging)
MCU: Recognizes connectivity to the motion detector via internal programming, physical switch or software switch; analyzes the signal from the motion detector for the motion status of the vehicle Signal generator: Inactive
Cellular Radio: Inactive
Vehicle moving; disabling device installed
Interface: Power available from the disabling device is battery
Power source (battery): Active
MCU: Recognizes connectivity to the motion detector via internal programming, physical switch, or software switch; analyzes the signal from the motion detector for the motion status of the vehicle
Signal generator: Sends the disabling signal nominally every twenty (20) seconds
Cellular Radio: Inactive Vehicle in motion or not in motion; disabling device Installed; power from (primary) battery is unavailable for a predetermined period of time (e.g. two minutes)
Motion detector: Inactive
Power source (Primary battery): Inactive; not charging
Backup Power Source (Back-up battery): Active; Powers the MCU and the cellular radio
MCU: Recognizes connectivity to the motion detector via internal programming, physical switch or software switch; analyzes the signal from the motion detector for the motion status of the vehicle; recognizes (primary) battery power is unavailable for predetermined period of time (e.g. two minutes); initiates monitoring alert (e.g. push notification) indicating no (primary) battery power to the disabling device for a defined time period
Signal generator: Inactive
Cellular Radio: Transmits a monitoring alert to the monitoring party's device that the (primary) battery is not operational Exemplary Electronic Devices—Mobile Device and Disabling Device FIGS. 1 and 6 are block diagrams illustrating exemplary embodiments of disabling device 101 and mobile device 102, respectively. It should be understood these exemplary embodiments are merely illustrative of disabling device and a mobile device that could benefit from embodiments of the invention and, therefore, should not be taken to limit the scope of the invention. Moreover, the apparatus of an example embodiment need not be the entire device, but may be a component or group of components of the device in other example embodiments.

Regarding mobile devices, devices may readily employ embodiments of the invention regardless of their intent to provide mobility. In this regard, even though embodiments of the invention are described in conjunction with a mobile device, it should be understood that embodiments of the invention may be utilized in conjunction with a variety of other electronic devices.

The devices may each comprise a processor or other processing circuitry. As used in this application, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), software, and memory(ies) that work together to cause an apparatus, such as a mobile phone or tablet, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims.

As a further example, as used in this application, the term "circuitry" would also cover an implementation of merely a processor, multiple processors, gate arrays, programmable logic arrays, field-programmable gate arrays, discrete logic or a portion of a processor and its (or their) accompanying software and/or firmware.

Further, the processor(s) may comprise functionality to operate one or more software programs, which may be stored in memory and which may, among other things, cause the processor to implement at least one embodiment including, for example, one or more of the functions described above. The mobile device may comprise a user interface for providing output and/or receiving input. The mobile device may comprise an output device such as a ringer, a conventional earphone and/or speaker, a microphone, a display, and/or a user input interface, which are coupled to the processor. The user input interface, which allows the electronic device to receive data, may comprise means, such as one or more devices that may allow the electronic device to receive data, such as a keypad, a touch display, for example if the display comprises touch capability, and/or the like.

The devices may comprise a physical memory device including, in one embodiment, volatile memory, such as volatile Random Access Memory (RAM) including a cache area for the temporary storage of data. The devices may also comprise other physical memory, for example, non-volatile memory, which may be embedded and/or may be removable. The non-volatile memory may comprise an EEPROM, flash memory or the like. The memories may store any of a number of pieces of information, executable instructions, and data. The information, executable instructions and data may be used by the devices to implement one or more functions of the devices.

Figure 11:
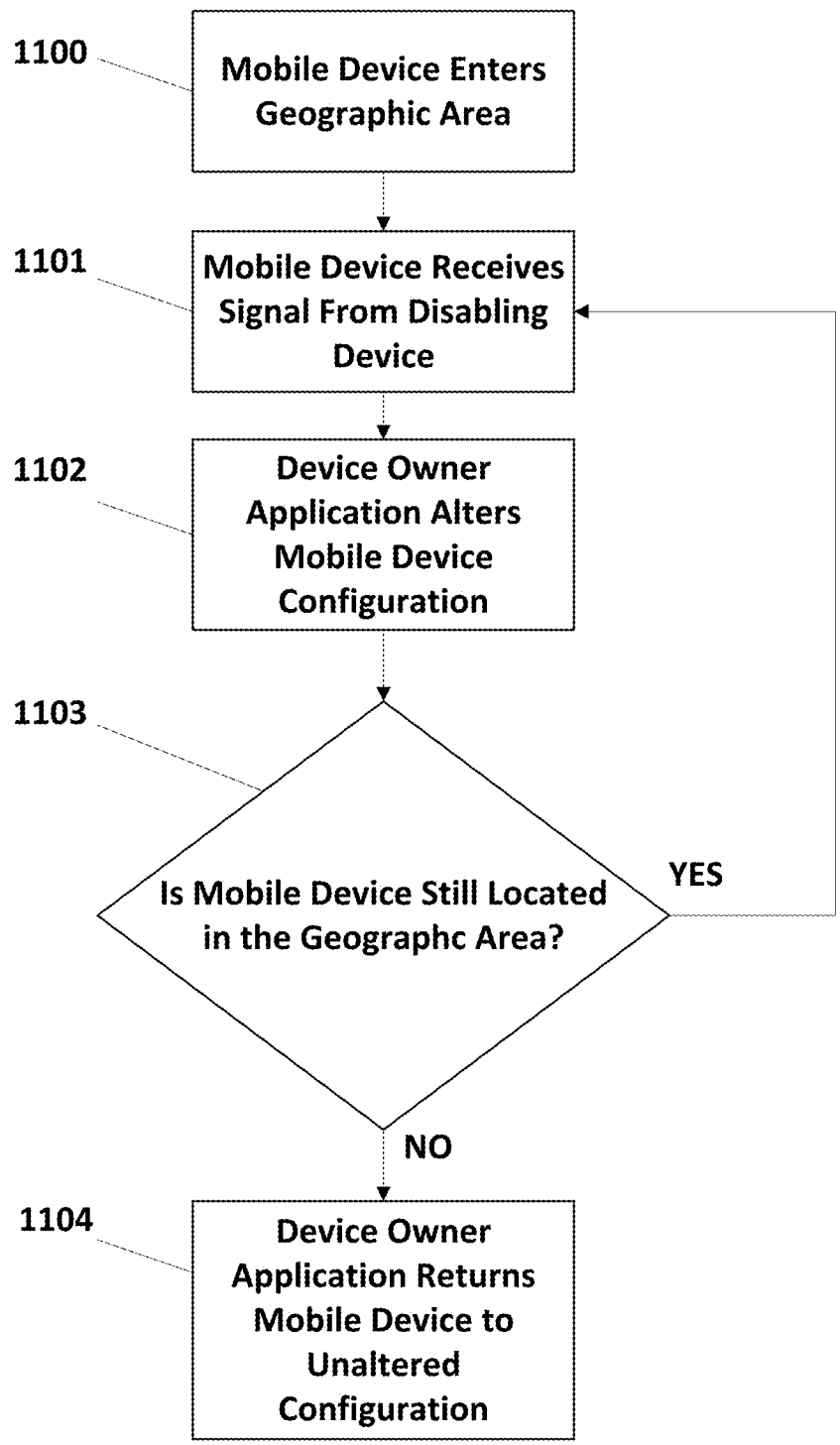
FIG. 11 depicts a flow diagram for an embodiment of the invention in which the system and method of the device restrict mobile device functionality within a geographic area.

A further embodiment of the system and method of the invention is depicted in FIG. 10, which depicts an exemplary embodiment of the system and FIG. 11, which depicts an exemplary flow diagram of the steps of the method. Referring now to FIGS. 10 and 11, at least one disabling device 101 transmits a disabling signal 1202 within and to the extent of a geographic area 1200, which has a boundary 1201. A plurality of disabling devices, which need not be co-located, may be used in order to create any desired shape or size geographic area 1200. Geographic area 1200 is depicted as circular in shape in FIG. 10, but this shape is exemplary only. Geographic area 1200 may be any arbitrary shape in which disabling signal 1202 is able to be received by mobile device 102. Geographic area 1200 is not limited to a plane, in other words confined to only two dimensions, but may be any three dimensional shape. As such, geographic area 1200 could be, by way of example and not limitation, a hemispherical shape. In such cases the boundary 1201 of geographic area 1200 would comprise a surface area. Whether two dimensional or three dimensional, geographic area 1200 may take any arbitrary shape by the appropriate placement of antennas through which disabling signal 1202 is transmitted or by shaping antenna radiation patterns using techniques known in the art, or alternatively, a plurality of disabling devices 101 $m$ transmit disabling signals, in order to achieve a predefined desired geographic area 1200 and boundary 1201. Geographic area 1200 and disabling signal, or signals, 1202 may be utilized to provide mobile device functionality limitation as described herein for any area or volume in which mobile device limitation is desired, for example work areas designated by employers such as retail store sales floors, warehouses, factory and manufacturing facilities, and offices; areas related to vehicular traffic such as crosswalks and intersections; areas in which danger may be present requiring that a mobile device user stay alert and not be distracted by the use of a mobile device such as subway or train platforms; areas in which specified activities are expected to occur requiring a mobile device user to pay attention and not be distracted by the use of a mobile device such as classrooms or lecture halls; and any other geographic area in which it is desired that person's situational awareness not be diminished or subject to distraction. When mobile device 102 is positioned outside the boundary of geographic area 1201 such as in position A, the receiver of mobile device 102 does not receive disabling signal 1202 transmitted by disabling device 101, because mobile device 102 is outside boundary 1201 and is therefore outside the coverage area of disabling signal 1202. As mobile device 102 is moved to the boundary 1201 along direction A' to position B, corresponding to step 1100 of FIG. 11, the receiver of mobile device 102 is able to receive disabling signal 1202 because it has moved across the boundary 1201 into geographic area 1200 and is therefore within the coverage area of disabling signal 1202. When mobile device 102 crosses boundary 1201 into geographic area 1200 the Device Owner Application on mobile device 102 receives disabling signal 1202, corresponding to step 1101 of FIG. 11, and responds to disabling signal 1202 by altering mobile device 102 configuration as described elsewhere herein, corresponding to step 1102 of FIG. 11, which may include, but is not limited to restricting the mobile device's ability to send and receive text messages and email messages; restricting the mobile device's ability to respond to user input; restricting the mobile device's ability to place and receive phone calls; restricting the mobile device's ability to place and receive phone calls requiring user interaction with a touch screen or a keyboard of the mobile device; restricting the mobile device's ability to utilize a web browser application; restricting the mobile device's web browser from accessing predetermined web sites; and any other predetermined restriction of mobile device functionality as may be desired. As mobile device 102 moves along direction B' to position C, the mobile device receiver continues to receive disabling signal 1202 because mobile device 102 is still in geographic area 1200, i.e., mobile device 102 remains within the geographic area boundary 1201, and the Device Owner Application on mobile device 102 continues to limit the functionality of mobile device 102 as described, corresponding to the "YES" leg of the decision step 1103 of FIG. 11. As mobile device 102 moves along direction C' to position D, the mobile device receiver continues to receive disabling signal 1202, and the Device Owner Application on mobile device 102 continues to receive disabling signal 1202 and to limit the functionality of mobile device 102 in response to disabling signal 1202 as described, however as mobile device moves along direction D' and exits geographic area 1200 by crossing geographic area boundary 1202 as it moves towards position E, mobile device 102 is no longer able to receive disabling signal 1202, corresponding to the "NO" leg of step 1103 of FIG. 11. When mobile device 102 moves out of geographic area 1200 by crossing boundary 1201 moving in direction D' towards position E and is no longer able to receive disabling signal 1202, the Device Owner Application on mobile device 102 responds to loss of disabling signal 1202 by returning mobile device 102 to the unaltered configuration, corresponding to step 1104 of FIG. 11, allowing the mobile device to operate normally, meaning the Device Owner Application no longer restricts the functionality of mobile device 102. In an embodiment, the disabling device 101 depicted in FIG. 10 may comprise only a signal generator; or a signal generator and an MCU, or any other subset of the functions depicted in FIG. 1.

Although the figures of the drawings illustrate example embodiments of a disabling device and mobile device, respectively, which may perform the functions of the system and method of the embodiments of the invention, the disabling device and the mobile device as depicted in the figures are each merely an example of devices that may utilize embodiments of the invention.

Embodiments of the invention may be implemented in software, firmware, programmable logic such field programmable gate arrays, hardware, application logic or a combination of software, hardware, and application logic. The software application logic and/or hardware may reside on the apparatus, a separate device, or a plurality of separate devices. If desired, part of the software application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with two examples of a computer described and depicted in FIGS. 1 and 6. A computer readable medium may comprise a computer-readable storage medium that may be any tangible media or means that can contain or store the instructions for use by or in connection with an instruction execution system, apparatus, or device, such as a computer. Any software or application described herein may comprise computer executable instructions for carrying out the steps described herein, and such instructions shall be non-transitory in nature and reside in computer readable media.

The geographic area may be shaped such that functionality of mobile device 102 is restricted in virtually any desired area or volume. For example, the Device Owner Application of the invention could be installed on mobile devices of employees of a certain workplace or on the mobile devices of students of a school to avoid distracting features of the mobile device such as texting, internet, or photography. The disabling signal would be transmitted by an existing or previously installed signal generator as described above; however, the mechanism triggering the disabling signal would be, for example, an physical on/off switch or a software timer that turned the disabling signal on and off at certain times of the day, rather than motion status of the vehicle. The app would query a list, or whitelist, of media access control (MAC) addresses to determine if a received disabling signal is coming from a valid source as described previously. Alerts such as the removal of the primary app or secondary app would be communicated to a monitoring party (such as the workplace owner) device as described previously.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system of limiting mobile device functionality in a fixed geographic area in which it is desired to limit or control the use of a mobile device, comprising:
   a disabling device able to transmit a disabling signal that is effective in the fixed geographic area; and
   a Device Owner Application capable of residing on a mobile device capable of receiving the disabling signal, wherein said Device Owner Application is able to alter the mobile device's system configuration responsive to the disabling signal when said mobile device is located within the fixed geographic area;
   wherein said Device Owner Application is defined as an application that cannot be disabled by a user unless a hardware reset of the mobile device is performed.

2. The system of claim 1, wherein the Device Owner Application is able to alter the mobile device's system configuration to restrict the mobile device's ability to send and receive text messages and email messages when said mobile device is located within said fixed geographic area.

3. The system of claim 2, wherein the Device Owner Application is able to alter the mobile device's system configuration to restrict the mobile device's ability to respond to user input when said mobile device is located within said fixed geographic area.

4. The system of claim 1, wherein the Device Owner Application is able to alter the mobile device's system configuration to restrict the mobile device's ability to place and receive phone calls when said mobile device is located within said fixed geographic area.

5. The system of claim 1, wherein the Device Owner Application is able to alter the mobile device's system configuration to restrict the mobile device's ability to place and receive phone calls requiring user interaction with a touch screen or a keyboard of the mobile device when said mobile device is located within said fixed geographic area.

6. The system of claim 1, wherein the Device Owner Application is able to alter the mobile device's system configuration to restrict the mobile device's ability to utilize a web browser application on the mobile device to access pre-determined web sites.

7. The system of claim 1, wherein said pre-determined web sites are further defined to be all web sites.

8. The system of claim 1, wherein said transmission of said disabling signal does not require an affirmative action by a user to communicate.

9. The system of claim 1, wherein the fixed geographic area is further defined as being selected from the group consisting of a work area, a school area, a vehicle traffic area, and a train platform.

10. A method of limiting mobile device functionality in a fixed geographic area in which it is desired to limit or control the use of a mobile device when the mobile device is located within said fixed geographic area comprising:
    providing a disabling device capable of transmitting a disabling signal, said disabling signal being effective within said fixed geographic area, and not being effective outside the fixed geographic area;
    transmitting said disabling signal within said fixed geographic area;
    receiving said disabling signal by a mobile device comprising a Device Owner Application, said mobile device receiving said disabling signal as long as the mobile device is located within the fixed geographic area;
    limiting the functionality of the mobile device by the Device Owner Application as long as the mobile device is located within the fixed geographic area;
    wherein said Device Owner Application is defined as an application that cannot be disabled by a user unless a hardware reset of the mobile device is performed.

11. The method of claim 10, further comprising:
    polling, at the mobile device, for the disabling signal from the disabling device;
    receiving, at the mobile device, the disabling signal; and
    altering the mobile device's system configuration responsive to the disabling signal being valid, said altering carried out by said Device Owner Application.

12. The method of claim 11, wherein the fixed geographic area is further defined as being selected from the group consisting of a work area, a school area, a vehicle traffic area, and a train platform; and wherein said functionality is defined as being selected from the group consisting of the ability to place a phone call, the ability to send and receive text messages and email messages, the mobile device's ability to respond to user input, and the ability to utilize a web browser to access web sites via the Internet.

13. A method of limiting mobile device functionality in a fixed geographic area in which it is desired to limit or control the use of a mobile device comprising:
    polling, at the mobile device, for a disabling signal from a disabling device;
    receiving, at said mobile device, a disabling signal from said disabling device when said mobile device is located in said fixed geographic area;
    altering, by a Device Owner Application on the mobile device, the mobile device's system configuration responsive to the disabling signal;
    polling for the disabling signal; and
    restoring the mobile device's system configuration responsive to not receiving the disabling signal after a pre-determined amount of time;
    wherein said Device Owner Application is defined as an application that cannot be disabled by a user unless a hardware reset of the mobile device is performed.

14. The method of claim 13, wherein the disabling signal comprises an identifier.

15. The method of claim 13, wherein altering the mobile device's system configuration comprises restricting the mobile device's ability to send and receive text messages and emails.

16. The method of claim 15, wherein altering the mobile device's system configuration further comprises restricting the mobile device's ability to respond to user input.

17. The method of claim 13, wherein altering the mobile device's system configuration comprises restricting the mobile device's ability to place and receive phone calls.

18. The method of claim 13, wherein altering the mobile device's system configuration comprises restricting the mobile device's ability to place and receive phone calls that require user interaction with a touch screen or a keyboard of the mobile device.

19. The method of claim 13, wherein the Device Owner Application residing on the mobile device further alters the mobile device's system configuration to restrict the mobile device's ability to utilize a web browser application on the mobile device to access pre-determined web sites.

20. The method of claim 19, wherein said pre-determined web sites are further defined to be all web sites.

* * * * *